United States Patent [19]

Suzuki et al.

[11] 4,161,203
[45] Jul. 17, 1979

[54] PNEUMATIC RADIAL TIRE

[75] Inventors: Yasuo Suzuki, Akigawa; Masaru Abe, Sayama; Toshiro Tezuka, Higashi-Murayama, all of Japan

[73] Assignee: Bridgestone Tire Company Limited, Tokyo, Japan

[21] Appl. No.: 791,072

[22] Filed: Apr. 26, 1977

[30] Foreign Application Priority Data

Apr. 28, 1976 [JP] Japan .................. 51/47728

[51] Int. Cl.$^2$ ........................... B60C 9/22; B60C 9/12
[52] U.S. Cl. ................... 152/361 R; 152/356 R; 152/359; 152/361 FP; 152/361 DM
[58] Field of Search ........... 152/356, 359, 360, 361 R, 152/361 FP, 361 DM, 357 R

[56] References Cited

U.S. PATENT DOCUMENTS

| | | | |
|---|---|---|---|
| 3,242,965 | 3/1966 | Mirtain | 152/361 DM |
| 3,345,228 | 10/1967 | Kovac et al. | 152/356 X |
| 3,392,774 | 7/1968 | LeBosse | 152/361 R |
| 3,449,199 | 6/1969 | Mead | 152/357 R X |
| 3,543,828 | 12/1970 | Caille et al. | 152/361 R |
| 3,667,529 | 6/1972 | Mirtain | 152/359 X |
| 3,682,222 | 8/1972 | Alderfer | 152/361 R |
| 4,077,454 | 3/1978 | Miyoshi et al. | 152/361 R |

FOREIGN PATENT DOCUMENTS 2096405  2/1972  France ..................... 152/359
 851898 10/1960  United Kingdom ........... 152/361 DM Primary Examiner—Francis S. Husar
Assistant Examiner—Randolph A. Reese
Attorney, Agent, or Firm—Sughrue, Rothwell, Mion, Zinn and Macpeak

[57] ABSTRACT

A pneumatic radial tire comprising a carcass, and a belt interposed between a tread and the carcass composed of at least two main cord layers whose cords are formed of an inextensible material such as a steel cord is disclosed. The tire further comprises at least one rubberized reinforcing layer interposed between the belt and the carcass and containing reinforcing elements. The reinforcing element is formed of a helically formed filament or a bundle of a plurality of helically formed filaments. The filament has a tensile breaking strength of at least 140 kg/mm$^2$ and elongation at tensile breaking strength which is at least 1.2 times the smallest elongation at tensile breaking strength of the main cord layers of the belt. The rubberized reinforcing layer as a whole is extensible and compressible.

5 Claims, 11 Drawing Figures $$D = \frac{D_{max} + D_{min}}{2}$$

PNEUMATIC RADIAL TIRE

This invention relates to pneumatic radial tires and more particularly to an improved belt construction of a radial tire or semi-radial tire comprising a carcass including cords arranged in parallel or substantially parallel with a vertical center section through the rotational axis of the tire and a belt arranged in a tread portion of the tire, the tire has excellent rigidity in the circumferential direction of the tire.

The terms "radial tire and semi-radial tire" commonly used in pneumatic tire technique shall be understood to mean a tire constructed such that a carcass is composed of one or a plurality of plies each formed of cord fabric and extending from one to another bead and that the cord of each ply is arranged in parallel or substantially parallel with the vertical center section through the rotational axis of the tire.

The radial tire comprises further a belt interposed between the carcass and a tread of the tire and composed of one or a plurality of rubberized layers each containing cords embedded therein and usually not provided with a weft.

Each of such cords of the rubberized layers of the belt is usually formed of inextensible material cord, for example, steel cord, glass fiber cord and the like. These cords are usually extended in parallel with each other in the rubberized layer and inclined at a small angle with respect to the circumferential direction of the tire and superimposed one upon the other.

It is no exaggeration to say that the cornering performance, wear resistance, anti-skid property and cut resistant property inherent to the radial tire are determined by the belt construction. It is possible to provide such belt construction by using a belt having a high rigidity in the circumferential direction of the tire.

The high rigidity in the circumferential direction of the belt is obtained by using the belt formed of inextensible material cord and by inclining the cords of the belt at a small angle with respect to the circumferential direction of the tire.

On the one hand, in the radial tire, the cords of the carcass ply are normally inclined at an angle of 90° or substantially 90° with respect to the circumferential direction of the tire.

The difference between the cord angles of the belt and the carcass causes troubles in both the manufacture and the use of a radial tire.

That is, in the case of manufacturing a radial tire, a shaped green tire having an outer diameter which is slightly smaller than a tire product is expanded in a vulcanization mold to provide the tire product. In this case, the outer periphery of the belt becomes elongated and the cord angle thereof is also changed such that the cord angle with respect to the circumferential direction becomes smaller than that of the green tire. The force subjected to the belt cords and for changing the cord angle thereof produces a force that tends to bend the carcass ply cord.

The force that tends to bend the carcass ply cord functions to act on rubber sandwiched between the carcass and belt, so that if the thickness of this rubber is made thick, it is possible to reduce the force subjected thereto. However, the use of thick rubber causes the belt to decrease its circumferential rigidity, so that the characteristics inherent to the radial tire are degraded and heat accumulation becomes large.

As a result, the force that tends to bend the belt cords functions to wave the carcass cords or wave the belt. Such cord waves frequently occur in a large size radial tire for trucks, buses, construction vehicles, etc. which makes use of a number of belts and requires a high rigidity of the belt.

When a radial tire is used under load, the main strain produced on the belt during its movement becomes different from the main strain produced on the carcass cord during its movement owing to difference between the cord angles of the belt and the carcass, and as a result, a large shearing strain is produced between the belt and the carcass, thereby causing breakage between the belt and the carcass.

An attempt has been made to interpose an additional belt having cords inclined at an intermediate angle of approximately 60° with respect to the circumferential direction of the tire and such construction has been used in practice.

This construction tends to reinforce the inferior property in the vertical center section through the rotational axis of the tire which is inherent to the belt having a cord angle which is substantially parallel to the circumferential direction of the tire and hence form a so-called triangular belt construction, thereby improving the steering stability and wear resistance inherent to the radial tire. But, such a desired construction can only be obtained when the belt is formed of a relatively extensible cord such as a textile cord or when the carcass cord is formed of the textile cord.

In a radial tire for trucks, buses or large size construction vehicles whose carcass cord and belt cord are formed of an inextensible material such as a steel cord, occurrence of cord wave failure is unavoidable. When the cord angle of the additional belt is substantially in parallel with the vertical center section through the rotational axis of the tire, the cord wave occurs at the additional belt. When the cord angle of the additional belt is substantially in parallel with the circumferential direction of the tire, the cord wave occurs at the carcass.

In a large size radial tire whose carcass cord only is formed of a textile cord, occurrence of cord wave is also unavoidable.

It has been well understood by those skilled in the art that such a cord wave exerts a bad influence upon tire characteristics. That is, the cord wave particularly increases strain at the belt end thereby considerably deteriorating the durability of the tire.

An object of the invention, therefore, is to provide a pneumatic radial tire which can effectively obviate the above mentioned drawbacks which have been encountered with the prior techniques and which can eliminate the cord wave of the belt or the carcass which is produced when the tire reinforcing element is formed of an inextensible material such as a steel cord, etc. and which has excellent durability.

A feature of the invention is the provision of in a pneumatic radial tire comprising a carcass composed of cords arranged in parallel or substantially parallel with a vertical center section through the rotational axis of the tire and a belt interposed between a tread and said carcass. The belt is composed of at least two main cord layers whose cords are formed of an inextensible material such as a steel cord and arranged along different directions crossed at a small angle with respect to the circumferential direction of the tire. The invention comprises at least one rubberized reinforcing layer interposed between said belt and said carcass and containing reinforcing elements spaced apart from each other and embedded therein, said reinforcing element being formed of a helically formed filament or a bundle of a plurality of helically formed filaments, said helically formed filament being formed of material having a tensile breaking strength of at least 140 kg/mm$^2$ and elongation at tensile breaking strength which is at least 1.2 times the smallest elongation at tensile breaking strength of the cord of said main cord layers of said belt, and said rubberized reinforcing layer as a whole being extensible and compressible.

The inventors have investigated the reasons why the cord wave is produced in the belt formed of an inextensible cord such as a steel cord and means for preventing such cord wave.

It has been well known to vulcanize a green tire composed of assembled essenntial members and shaped in a mold so as to manufacture a tire. The shape of such green tire of a bias tire is considerably different from that of a radial tire. That is, the green tire for the bias tire is of cylindrical shape, while the green tire for a radial tire is of toroidal shape which is substantially the same as that of the tire products.

This is because of the fact that a radial tire makes use of a belt having a high circumferential rigidity, so that if the green tire thereof is of cylindrical shape, it is difficult to expand its outer diameter in the vulcanization mold. Even in the radial tire, the circumferential length of the green tire is different from that of the tire product. Because, in tires in general, a pattern is formed on the tread surface of the tire in the vulcanization mold. For this purpose, the vulcanization mold is provided at its inside with a pattern molding surface projected therefrom, so that the outer diameter of the green tire is required to be made smaller than that of the tire product.

In a tire for passenger cars whose tread rubber is thin in thickness and hence a tread groove is small in depth, the amount of expansion of the outer diameter is small. But, in a large size tire for construction vehicles, for example, the amount of expansion of the outer diameter is far larger than that of the tire for passenger cars. In a large size tire having a size of 18.00-33 E-3, for example, the mold surface for forming the tread groove is projected from its one side surface by 35 mm, so that the circumferential length of the green tire of 5,070 mm is changed into that of the tire product of 5,310 mm. Such increase of the outer diameter of the tire causes the belt to forcably change the cord angle thereof.

In general, the cord angle of the bias tire is changed in accordance with the following equation:

$$l_1/\cos \theta_1 = l_2/\cos \theta_2 \qquad (1)$$

where $l_1$ is an outer diameter of a ply of a green case, $\theta_1$ is an angle of the ply of the green case with respect to the circumferential direction of the tire, $l_2$ is an outer diameter of a ply of a tire product and $\theta_2$ is an angle of the ply of the tire product with respect to the circumferential direction of the tire.

The above equation is called as a pantagraph deformation or notching theory and has generally been used in design of the tire.

The radial tire has a cord angle which is small with respect to the circumferential direction of the tire, so that the above equation is not applicable to the radial tire. But, the above equation multiplied by a slip coefficient may be applied to the radial tire in practice. This is because of the fact that the increase of the outer diameter is not caused by the change of the cord angle only, but is caused by the change of the cord angle as well as by enlargement of a distance between two adjacent cords.

Even in the case of a large size tire comprising a belt composed of steel cords and including a number of belts, in order to change the cord angle, the tire in the vulcanization mold is expanded by applying an internal pressure of 14 kg/cm$^2$ to 25 kg/cm$^2$ therein.

This expansion force is exerted to the belt, but that component of the expansion force which is exerted in the cord direction of the belt acts considerably upon the cord of the main cord layer of the belt mainly arranged along the circumferential direction of the tire and having a small elongation. That cord of the belt which has a large cord angle with respect to the circumferential direction of the tire is not subjected to so much amount of tension in the cord direction. This cord becomes rigid only when the tension is subjected thereto. Experience has demonstrated that nylon cord, for example, becomes easily deformed by any small force applied thereto in a transverse direction when it is not subjected to tension.

As a result, if the cord angle of the additional belt layer interposed between the carcass and the belt is nearly equal to the cord angle of the main cord layer of the belt, the cord angle of the additional belt layer is changed in response to the movement of the main cord layer of the belt. If the cord angle of the additional cord belt layer is at least 45° with respect to the circumferential direction of the tire, the direction of force required for changing the cord angle becomes considerably different from the direction of the force subjected to the main cord belt layer, so that the movement of the main cord belt layer for producing a strong tensile strength causes the cord of the additional cord belt layer to be subjected to small tension, and as a result, the cord is bent to produce the cord wave.

In a radial tire, the belt is subjected to tension, so that the carcass beneath the belt is not substantially subjected to the tension. This has been found out by the inventors' investigations. As a result, if a belt formed of a steel cord, etc. having a high rigidity is directly superimposed on the carcass cord and inclined at angle which is nearly equal to the circumferential direction of the tire, the change of the cord angle of the belt causes a cord wave of the carcass ply.

Calculation treatments have shown that when the belt cord angle is changed from 25° to 21° the carcass cord must be contracted by 27.2% in the absence of slip. In practice, however, slip occurs due to the presence of the coating rubber between the belt and the carcass. In addition, the presence of a distance between the two adjacent cords causes the carcass cord to be contracted by a value considerably larger than 27.2%.

In order to prevent such contraction of the carcass cord, an attempt has been made to interpose a thick rubber sheet between the carcass and the belt so as to eliminate the cord wave of the carcass cord by the deformation of the rubber sheet. On the other hand, the circumferential rigidity of the tire in service is produced due to a sort of deformation resistance, so that the deformation of the steel cord results in the deformation of the rubber. As a result, the circumferential rigidity of the tire becomes large, thereby degrading the rigidity of the belt inherent to the radial tire.

In order to eliminate such disadvantage, the inventors investigated a material having an elongation and compressive property that is easily deformable in the cord direction and can absorb deformation force without producing the cord wave and the inventors also investigated the configuration of the above-mentioned material. As a result, the inventors have noted a helically formed steel filament described in the U.S. Pat. No. 3,682,222 and having a property and configuration to be described later.

The inventors have found out that an optimum combination of a belt formed of inextensible material such as a conventional steel cord, etc. and a reinforcing layer formed of the above described helically formed steel filament is capable of manufacturing a tire which can eliminate the cord wave without degrading the advantage inherent to the radial construction itself.

That is, the above described object of the invention can be attained by the use of the basic belt formed of material having a small elongation such as a conventional steel cord and by interposing between the carcass and the belt a reinforcing layer formed of a helically formed filament having excellent elongation and compressive properties.

The helically formed filament may be formed of not only steel but also metal or glass having a small elongation or an organic material. The inventors have found that nylon, rayon and the like used as a conventional tire cord and having a tensile breaking strength on the order of 80 to 110 kg/mm$^2$ could not exhibit the ability of the reinforcing element which corresponds to the ability of the main layer of the belt and that the object of the invention can be attained by using material having a tensile breaking strength of at least 140 kg/mm$^2$, preferably at least 170 kg/mm$^2$.

The tensile breaking strength is used as a factor of limiting the property of representing the cord rigidity.

Tensile breaking strength of at least 140 kg/mm$^2$ is required for the purpose of exhibiting the maximum cut resistant ability and steering stability due to the triangular configuration of the belt inherent to the radial tire and of effectively absorbing the deformation due to the main layer of the belt without producing any cord wave of the carcass cord.

The carcass body of the radial construction tire according to the invention is composed of one or a plurality of rubberized plies each containing cords formed of steel, metals or organic fiber and is of a radial or semiradial construction in which the above mentioned cords are arranged in parallel with or at a small angle with respect to the vertical center section through the rotational axis of the tire.

The belt interposed between the carcass and the tread is composed of at least two main belt layers each formed of cords having a tensile breaking strength of at least 190 kg/mm$^2$ and elongation at tensile breaking strength of at most 5%, the cords being inclined at an angle of at most 30° with respect to the circumferential direction of the tire. Between the main layer of the belt and the carcass a reinforcing layer is interposed composed of helically formed filaments. Before describing the configuration, construction and effect of the reinforcing layer in greater detail, the configuration and construction of a reinforcing elemennt formed of helically formed filaments according to the invention will be described.

The reinforcing element is composed of one or a bundle of a plurality of, particularly 2 to 50, preferably 3 to 30 of flexible and permanently helically formed relatively thin filaments. Each of these filaments is formed of material having a tensile breaking strength of the above described range and filamennt diameter of 0.1 mm to 1.0 mm, preferably 0.13 mm to 0.5 mm. These filaments are assembled together without twisting at random and without binding the bundle thus formed by any exterior binding wire to provide a cord-shaped reinforcing element.

The invention will now be described in greater detail with reference to the accompanying drawings, wherein:

FIG. 1b is its section showing an outer contour projected on a plane perpendicular to the axial direction of one pitch of the filament shown in FIG. 1a;

Figure 1A:
FIG. 1a is a front elevational view showing a helically formed filament.
Figure 1B:
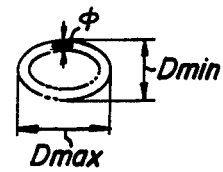

In FIG. 1a is shown a fronnt elevation of helically formed filament having a diameter $\phi$ and in FIG. 1b is shown an outer contour projected on a plane perpendicular to the axial direction of one pitch of the filament shown in FIG. 1a. The ideal shape of the outer contour should be a true circle for the purpose of equalizing the stress subjected to it. However, the technique of forming the filament into the true circle is very difficult. In addition, a number of steps are required in the case of incorporating the helically formed filaments whose outer contour is a true circle into the tire so that it is still more difficult to maintain the true circle of the outer contour of the filament in the tire product.

Experimental tests and investigations of determining the practically allowable deviation of the configuration of the outer contour from its true circle have concluded that if a ratio of a maximum diameter (Dmax) of the outer contour projected on a plane perpendicular to the axial direction of one pitch of the filament to a minimum diameter (Dmin) thereof lies within a range to be described later, the stress subjected to it becomes substantially uniformly distributed, and that hence premature fatigue breakage is not induced. For this purpose, in FIG. 1b, a ratio of the maximum diameter Dmax to the minimum diameter Dmin, that is, Dmax/Dmin is required to lie witthin a range of 1 to 1.3 and an average diameter D, that is (Dmax+Dmin)/2 of the outer contour projected on a plane perpendicular to the axial direction of one pitch of the filament should be 2$\phi$ to 20$\phi$, preferably 3$\phi$ to 15$\phi$.

As a method of obtaining a desirous elongation of filaments each formed of material having a high tensile breaking strength, for example, high carbon steel by arranging these filaments without twisting, it may be possible to arrange undulate filaments in parallel with each other and spaced apart from each other in one same plane. In this case, however, stress becomes concentrated into bent portions of the undulate filament in response to extension and compression in the lengthwise direction thereof. In addition, this stress is a bending stress to be concentrated into a part of the cross section of the filament, so that there frequently occurs the premature fatigue breakage at the bent portions of the filament. As a result, it has been found that the measures described could not be used in practice in place of the helically formed filament.

On the contrary, the use of the helically formed filament ensures a necessary elongation. In this case, the stress produced in response to the extension or compression in the lengthwise direction of the helically formed filament is substantially uniformly distributed over any portion in the lengthwise direction thereof. In addition, the above mentioned stress is a torsional shearing stress which is easily distributed in a relatively uniform manner over the cross section of the filament, so that it is possible to completely prevent the fatique breakage thereof.

The inventors' experimental tests and investigations have shown that in order to prevent the cord from being broken due to fatigue it is desirous to make one filament diameter $\phi$ small, and that, in the case of improving the cut resistant property of the filament, the tensile strength per unit area thereof can be increased by drawing it into a small filament diameter even when the filament material is the same. As a result, it might be desirous to use a filament which is as small as possible in diameter. But, the use of a filament whose diameter $\phi$ is smaller than 0.1 mm results in occurrence of cuts of the filament in non-allowable frequency in the step of shaping the helically formed filament and hence is not economical.

On the contrary, if use is made of a filament whose diameter $\phi$ is larger than 1.0 mm, internal stress produced in the filament during the step of shaping the helically formed filament becomes excessively large. In addition, torsional shearing stress which occurs when extension or compression is subjected to the filament in its lengthwise direction is concentrated into the outer contour portion of the filament. As a result, the overall cross sectional area required for the strength which is sufficient to withstand the same exterior force becomes larger than that necessary for the thin filament, thereby requiring a large amount of material. As a result, the use of the filament having a diameter larger than 1.0 mm is not economical.

As seen from the above, the diameter $\phi$ of the filament is required to lie within a range from 0.1 to 1.0 mm.

The relation between the diameter $\phi$ of the filament and the average diameter D of the outer contour projected on a plane perpendicular to the axial direction of one pitch of the filament will now be described. If D is smaller than $2\phi$, the pitch of the helically formed filament is required to be excessively small for the purpose of obtaining the desired elongation. As a result, the cuts of filaments frequently occur in non-allowable frequency in the same manner as in the case of using the filament whose diameter is excessively small. At the same time, the internal stress produced when the filament is helically formed becomes excessively large.

The helically formed filaments are assembled together without twisting at random into a cord-shaped reinforcing element and arranged in the tire. Since the helically formed filaments constituting each reinforcing element are arranged in a zigzag pattern, if D is larger than $2\phi$, that sectional area formed between the most protruded surfaces of two adjacent reinforcing elements which is sufficient to maintain a desired separation resistant property can only be obtained by using a small number of the reinforcing elements, and as a result, the reinforcing element becomes insufficient in terms of rigidity. If the number of the reinforcing elements is increased for the purpose of obtaining a sufficiently high rigidity of the reinforcing element, the above mentioned distance required between the two adjacent elements could not be obtained, so that a sufficiently high separation resistant property could not be obtained. In addition, in order to obtain the sufficiently high separation resistant property, not only the above mentioned distance required between the two adjacent reinforcing elements, but also the distance between the reinforcing element and the carcass in the case of one rubberized layer containing the reinforcing element as well as the distance between the two adjacent reinforcing elements in the case of at least two rubberized layers are required to be kept within a certain range. Moreover, a distance is required to be kept between the most protruded surfaces of the two adjacent reinforcing elements, so that it is necessary to use a thick rubber layer containing the reinforcing element embedded therein, thereby not only significantly impeding economy but also lowering the rigidity of the belt. As seen from the above, the average diameter D should be 2 to 20 times the diameter $\phi$ of the filament.

The pitch of the helically formed filament is suitably selected in association with modulus of elasticity of the filament, diameter $\phi$ of the filament and average diameter D of an outer contour projected on a plane perpendicular to the axial direction of one pitch of the filament for the purpose of obtaining optimum elongation at tensile breaking strength and modulus of elasticity required for the use of the tire.

The number of helically formed filaments adapted to be assembled together without twisting at random so as to provide a bundle constituting a reinforcing element will be described. If use is made of more than 50 helically formed filaments, the diameter of the bundle becomes excessively large even though the average diameter D of the helically formed filament is small. As a result, the same problem occurs as in the case of making the average diameter D excessively large. As a result, the number of helically formed filaments adapted to be assembled together without twisting at random to provide a bundle for constituting the reinforcing element is suitably selected into a range 2 to 50, preferably, 3 to 30, by balancing between the characteristics required for the use of the tire and economy.

The relation between the force subjected to the reinforcing element constructed as above described according to the invention and to a conventional stranded steel cord generally used for a belt on the one hand and elongation thereof on the other hand will now be described with reference to a practical example.

Figure 2:
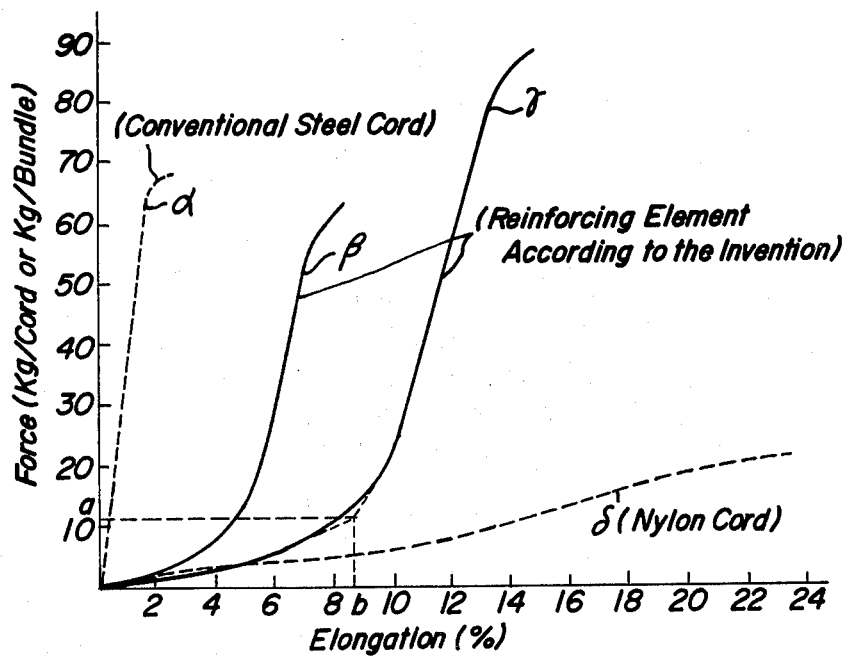
FIG. 2 is a graph illustrating the relation between the force subjected to the reinforcing element according to the invention and the conventional steel cord and the elongation produced in these element and cord.

In FIG. 2 is shown tensile test results with the force in kg/cord or kg/bundle plotted on the ordinate and with the elongation in % plotted the abscissa. In FIG. 2, the dotted lines curve α shows a tensile test result yielded from a conventional steel cord having a strand construction of 1×5, filament diameter $\phi$ of 0.25 mm and cord diameter of 0.68 mm and full line curves β and γ show tensile test results produced from reinforcing elements according to the invention. The tensile test result shown by the full line curve β was obtained from a reinforcing element composed of a bundle formed of 5 filaments according to the invention each having a filament diameter $\phi$ of 0.25 mm, average diameter D of an outer contour projected on a plane perpendicular to the axial direction of one pitch of the filament of 0.95 mm, Dmax/Dmin=1.25, D/$\phi$=3.8 and pitch of 10.5 mm. The tensile test result shown by the full line curve γ was obtained from a reinforcing element composed of a bundle of 14 filaments according to the invention each having a filament diameter $\phi$ of 1.175 mm, average diameter D of an outer contour projected on a plane perpendicular to the axial direction of one pitch of the filament of 1.1 mm, Dmax/Dmin=1.20, D/$\phi$=6.3 and pitch of 11 mm. In FIG. 2, the dotted lines curve δ shows a tensile test result from a conventional nylon cord of 1,260 denier/2 strands.

As seen from FIG. 2, the elongation within its proportional limit as function of the force subjected to the reinforcing elements according to the invention is larger than that of the conventional steel cord. That is, the elongation of the reinforcing elements according to the invention which is produced when the force subjected thereto is small is larger than that of the conventional steel cord. The reinforcing element according to the invention composed of helically formed filaments has an excellent extension and compression characteristic required for preventing undulation of a tire to be produced when the tire is shaped. Such elastic efficiency is important at the initial step of manufacturing the tire even when the tire is not always subjected to such a force that the cord becomes elongated and hence broken. It is understood, therefore, that the above mentioned characteristic of the reinforcing element according to the invention is ideal for the object of the invention.

The use of the reinforcing element composed of helically formed filaments according to the invention ensures a significant reduction of the compression modulus of elasticity of the reinforcing element. The difference between the compression modulus of elasticity and compression fatigue property of the reinforcing element according to the invention and those of the conventional stranded steel cord for tire belt layers will now be described with reference to a practical example.

Figure 3:
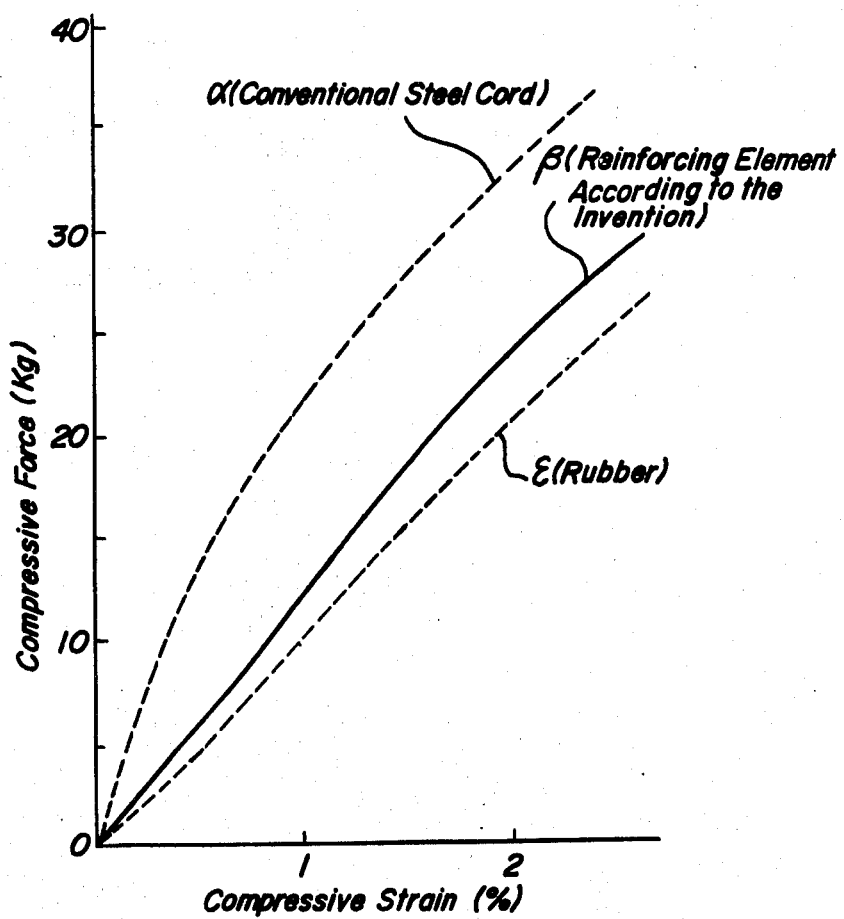
FIG. 3 is a graph illustrating the relation between the compression modulus of elasticity of the rubberized reinforcing element according to the invention and the conventional rubberized steel cord and that of rubber.

FIG. 3 shows compression test results. In FIG. 3, the compressive force in kg is plotted on the ordinate and the compressive strain in % is plotted on the abscissa. In this test, use was made of two test pieces, one of which being composed of a cylindrical rubber containing 1 conventional stranded steel cord embedded therein and the other being composed of a cylindrical rubber containing 1 bundle of helically formed filaments according to the invention embedded therein.

In FIG. 3, the dotted lines curve α shows the relation between the compressive force in kg subjected to the conventional stranded steel cord having a strand construction of 1×5, filament diameter $\phi$ of 0.25 mm and cord diameter of 0.68 mm and the compressive strain in % produced therein. A full line curve β shows the same relation of the reinforcing element according to the invention composed of 5 filaments each having a diameter $\phi$ of 0.25 mm, average diameter D of an outer contour subjected to a plane perpendicular to the axial direction of one pitch of the filament of 0.95 mm, Dmax/Dmin=1.25, D/$\phi$=3.8 and pitch of 10.5 mm. A dotted lines curve ε shows the same relation of a test piece formed of rubber only. It is a matter of course that the rubber of all of these test pieces is of the same rubber compound.

As seen from FIG. 3, the compression modulus of elasticity of the reinforcing element according to the invention is extremely small, whose value being close to a value of the rubber specimen.

Figure 4:
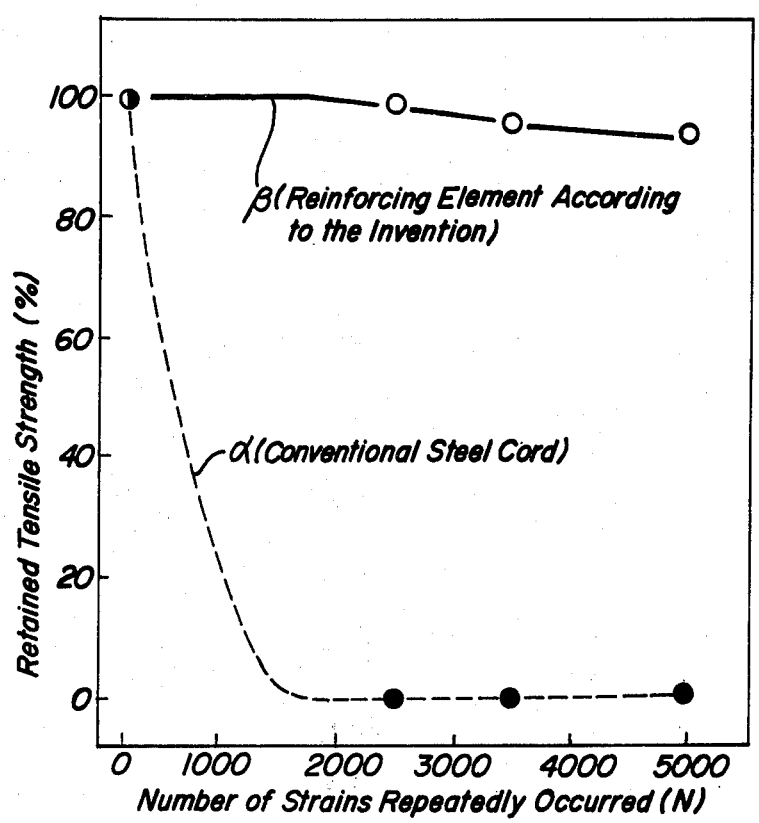
FIG. 4 is a graph illustrating the relation between the retained tensile strength vs number of strains repeatedly occurred of the reinforcing element according to the invention and that of the conventional steel cord.

FIG. 4 shows compression fatigue test results. Retained tensile strength in %, i.e. a percentage of tensile strength after the fatique test with that of a new tire is plotted on the ordinate and number of strains repeatedly occurred in N is plotted on the abscissa. In the present test, use was made of two test pieces, one being composed of a rectangular rubber body containing a plurality of conventional stranded steel cords embedded therein and the other being composed of a rectangular rubber body containing a plurality of bundles according to the invention embedded therein, and these two test pieces were subjected to 5% repeating compressive strain. In FIG. 4, a dotted lines curve α shows the retained tensile strength as function of the number of strains repeatedly occurred for the conventional stranded steel cord having a strand construction of 1×5, filament diameter $\phi$ of 0.25 mm and cord diameter of 0.68 mm and a full line curve β shows the same relation to that of the dotted lines curve α for the reinforcing element according to the invention composed of 5 filaments each having a filament diameter $\phi$ of 0.25 mm, average diameter D of an outer contour projected on a plane perpendicular to the axial direction of one pitch of the filament of 0.95 mm, Dmax/Dmin=1.25, D/$\phi$=3.8 and pitch of 10.5 mm. As seen from FIG. 4, the retained tensile strength of the element according to the invention is far superior to that of the conventional steel cord.

Configuration, construction and effect of the reinforcing layer composed of the reinforcing element shaped and constructed as above described will now be described.

In the first instance, as rubber which constitutes together with the reinforcing element the reinforcing layer, use may be made of a rubber compound having a Shore A hardness of 50° to 85°; 300% modulus of elasticity of 100 to 250 kg/cm$^2$, and tensile breaking strength of 150 to 250 kg/cm$^2$. It is preferable to use a so-called soft rubber having a large elongation and adapted to follow deformation of the reinforcing element and particularly rubber whose hardness and modulus of elasticity are equal to or smaller than those of the coating rubber of the belt.

The direction of arranging the reinforcing element in the reinforcing layer is not related so much to inclined angles of the reinforcing element with respect to the reinforcing layer in view of the object of using the reinforcing element. However, in order to arrange the reinforcing element with respect to the belt main layer in a triangular shape so as to improve its reinforcing effect, it is preferable that the reinforcing layer is inclined at an angle which is larger than that of the belt main layer and on the order of 35° to 90° with respect to the circumferential direction of the tire.

In addition, in order to effectively eliminate the undulation of the tire to be produced when the tire is shaped, it is preferable to arrange the reinforcing element in the same direction as the cords of the belt adjacent to the reinforcing layer.

In order to further improve the cut preventive effect of the belt, it is preferable to use at least two reinforcing layers and extend the reinforcing element associated with one of these layers in an opposite direction to the reinforcing element associated with the other layer. It should be understood, however, that the property of the reinforcing layer is related to the material and construction of the belt layer disposed on the reinforcing layer and those of the carcass cord disposed beneath the reinforcing layer.

That is, it is preferable that the reinforcing element has an elongation at tensile breaking strength which is at least 1.2 times, preferably at least 1.5 times the minimum elongation at tensile breaking strength of the main layer of the belt, modulus of elasticity within the proportional limit of at most $5 \times 10^3$ kg/mm$^2$, preferably at most $4 \times 10^3$ kg/mm$^2$ and compression modulus of elasticity which is at most 0.9 times, preferably at most 0.7 times the maximum compression modulus of elasticity of the steel cord for the main layer of the belt. The modulus of elasticity within the proportional limit shall be understood to mean a value given by $$(a/(b/100) \times S)$$

where a is a tension in kg within proportional limit in which elasticity is restored when a cord or reinforcing element is subjected to tension is released and b is an elongation in % produced in the cord or reinforcing element, a and b being shown in FIG. 3. S is an effective sectional area in mm$^2$ of the cord or reinforcing element.

The length of the reinforcing layer in its widthwise direction should not be equal to that of the belt disposed thereon, but may be made longer or shorter than that of the latter. Particularly, the length of the reinforcing layer composed of helically formed filaments in its widthwise direction may be made longer than that of the belt.

This is because of the fact that undue stress subjected to the tire when it is deformed can be absorbed by the strain produced in the lengthwise direction of the cord during its extension and contraction rather than change in cord angle thereof. In addition, the strain produced in the lengthwise direction of the cord is dispersed by the curl characteristic of the helically formed filament and hence is not intensely active in one direction only, thus preventing the tire from breaking. In addition, in the reinforcing element formed of a bundle of a plurality of helically formed filaments, these helically formed filamennts are not twisted together as in the case of the steel cord but are merely assembled together without twisting at random to provide the bundle. As a result, it is possible to sufficiently penetrate the rubber into a gap formed between the filaments to provide a mechanical bonding force which can compensate for insufficient filament-to-rubber chemical bonding force.

A rubberized layer containing cords formed of organic fiber such as nylon, etc. and interposed between the reinforcing layer and the carcass is capable of changing the rigidity of the tire in a stepwise manner.

Figure 10:
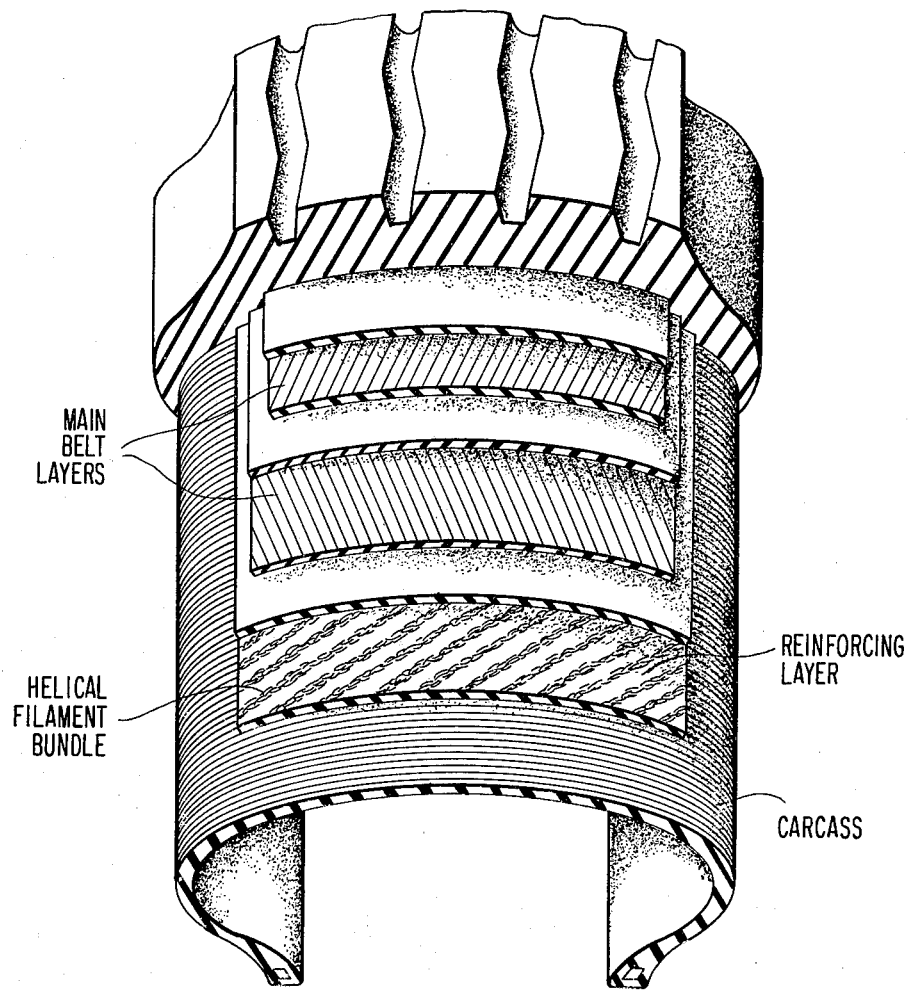
FIG. 10 shows a partially cutaway perspective view of an exemplary tire section in accordance with the invention.

The helically formed filament constituting the reinforcing element of the reinforcing layer may be formed of wire material having an excellent rubber-to-filament bonding property, particularly brass plated steel filament or any other metallic filaments, glass fiber or aromatic polyamide fiber and the like which can satisify the above mentioned requirements. Thus, the invention provides a radial construction tire comprising a belt having excellent characteristics which does not produce any cord wave. An exemplary construction is shown in the perspective view of FIG. 10, which illustrates the relative angular relationships between the various cord layers.

The invention will now be described with reference to practical examples.

EXAMPLE 1

Figure 5:
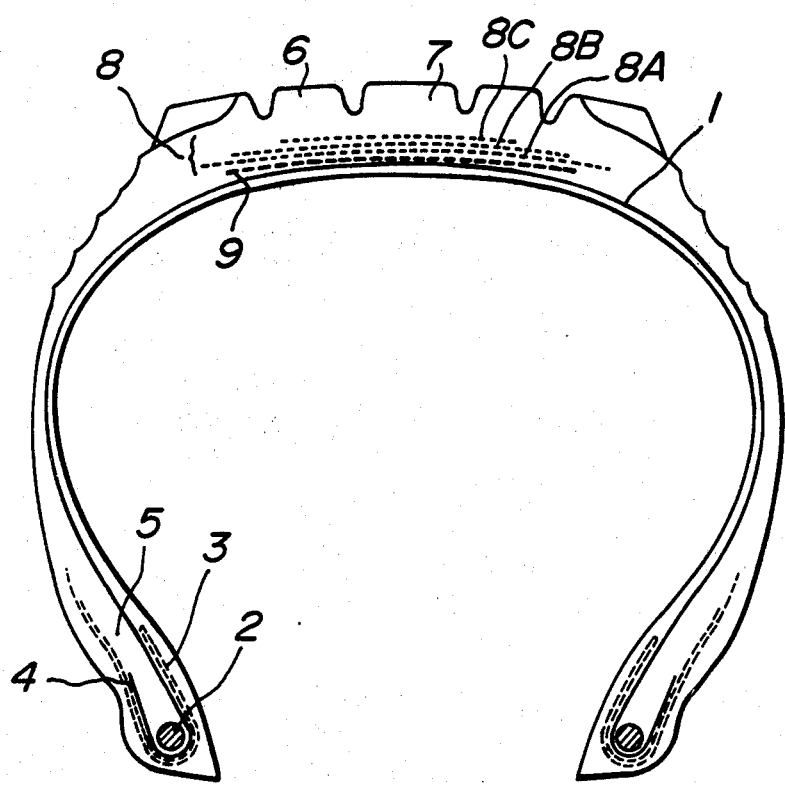
FIG. 5 is a cross sectional view taken along the vertical center section through the rotational axis of one embodiment of the tire according to the invention.

In FIG. 5 is shown a vertical center cross section through the rotational axis of a tire. The tire shown in FIG. 5 is a radial tire for trucks or buses having a tire size of 10.00 R20 14PR, 14PR being indicated on the basis of cotton yarn. A toroidal-shaped carcass 1 is composed of 1 rubberized ply containing steel cords each having a tensile breaking strength of 170 kg/cord and arranged in parallel with the vertical center cross section through the rotational axis of the tire. The ply of the carcass 1 is wound around a bead wire 2 to form a turn-up portion 4. In addition, in order to reinforce the bead portion, a chafer 3 formed of nylon cord is wound around the bead wire 2. In a region surrounded by the carcass 1, bead wire 2 and turn-up portion 4 of the carcass ply is arranged a bead filter 5 having a Shore A hardness of 80°.

Between the carcass 1 and a tread 7 in a tire crown portion 6 are interposed a belt 8 composed of 3 rubberized cord layers and 1 reinforcing layer 9. The belt 8 is arranged at the tread side and the reinforcing layer 9 is arranged at the carcass side.

Let the 3 rubberized cord layers of the belt 8 be designated by 8A, 8B and 8C arranged in the order as mentioned from the carcass side, respectively, these rubberized cord layers have respective constructions shown in the following Table.

Table

| | Tensile breaking strength | Elongation at breaking strength | Angle |
|---|---|---|---|
| 8A | 188 kg/cord | 3% | 18° toward right |
| 8B | " | " | 18° toward left |
| 8C | " | " | 18° toward left |

In the belt 8, 8A and 8B are main layers thereof.

Coating rubber of the belt 8 has a Shore A hardness of 78°, elongation at tensile breaking strength of 350% and 300% modulus of elasticity of 170 kg/cm$^2$.

The reinforcing layer 9 is composed of one rubberized ply containing a bundle of helically formed steel filaments embedded therein. The helically formed steel filament has a filament diameter $\phi$ of 0.25 mm, average diameter D of an outer contour projected to a plane perpendicular to the axial direction of one pitch of 0.95 mm, Dmax/Dmin=1.25, D/$\phi$=3.8 and pitch of 10.5 mm. Five of these helically formed filaments are assembled together without twisting at random to provide the reinforcing element. Eight reinforcing elements per 25 mm of the reinforcing layer are used and the reinforcing element is inclined at an angle of 60° toward right with respect to the circumferential direction of the tire.

The reinforcing element composed of five helically formed filaments has a tensile breaking strength of 70 kg/bundle, elongation at tensile breaking strength of 5.5%, modulus of elasticity of 1,800 kg/mm$^2$.

Coating rubber covering the reinforcing element has a Shore A hardness of 67°, 300% modulus of elasticity of 134 kg/cm² and elongation at tensile breaking strength of 430%.

In the conventional tire, the reinforcing layer 9 is composed of steel cords in the same manner as the belt 8. Such conventional reinforcing layer 9 causes cord waves therein. The rate in percent of occurrences of the cord wave is more or less different, but in the conventional reinforcing layer 9 the rate in percent of occurrences of the cord wave of at least 10 mm per 200 mm of the conventional reinforcing layer 9 is on the order of 3%. Experimental tests have demonstrated that the reinforcing layer 9 constructed as described above according to the invention renders it possible to reduce the rate in percent of occurrences of the cord wave to substantially zero.

In addition, indoor tread durability tests have demonstrated that the durability of the belt according to the invention is superior to that of the conventional belt by the order of approximately 55%. The indoor tread durability tests have shown that if the main belt layers 8A, 8B become broken, the tire life is ended, and that the reinforcing layer composed of helically formed steel filaments according to the invention does not act to increase movement of the main belt layer 8A, so that shearing force subjected between the two main belt layers 8A and 8B is smaller than that of the conventional reinforcing layer composed of steel cords.

EXAMPLE 2

Figure 6:
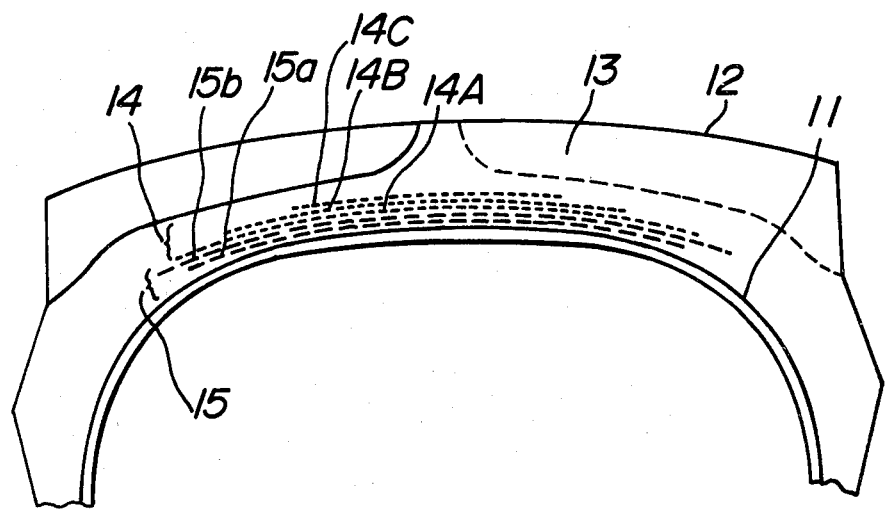
FIGS. 6, 7, 8 and 9 are cross sectional views similar to FIG. 5 showing various modified embodiments of the tire according to the invention.

In FIG. 6 is shown another embodiment of the invention as applied to a radial tire for construction vehicles. The tire has a size of 21.00 R 35 36PR for a 50 ton or 65 ton dump truck and a tread groove depth of E-3 (TRA). A carcass 11 is composed of one rubberized ply containing steel cords embedded therein and arranged in parallel with the vertical center cross section through the rotational axis of the tire.

The steel cord has a tensile breaking strength of 310 kg/cord and elongation at tensile breaking strength of 3.5%.

Between the carcass 11 and a tread 13 in a tire crown portion 12 are interposed a belt 14 composed of three rubberized cord layers and 2 reinforcing layers 15. The belt 14 is arranged at the tread side and the reinforcing layers 15 are arranged at the carcass side.

Let the three rubberized cord layers of the belt 14 be designated by 14A, 14B and 14C in the order as mentioned from the carcass side, respectively, these rubberized cord layers have respective constructions shown in the following Table.

Table

| | Tensile breaking strength | Elongation at breaking strength | Angle |
|---|---|---|---|
| 14A | 560 kg/cord | 3.3% | 20° toward right |
| 14B | " | " | 20° toward left |
| 14C | 410 kg/cord | 2.6% | 40° toward right |

In the belt 14, 14A and 14B are main layers thereof.

Coating rubber of the belt 14 has a Shore A hardness of 76°, 300% modulus of elasticity of 200 kg/cm² and elongation at tensile breaking strength of 310%.

The remaining rubberized cord layer 14C is provided at its both sides with coating rubber having a thickness of 1.25 mm and has a final thickness of 3.2 mm.

The reinforcing layer 15 is composed of two rubberized plies 15a, 15b each containing a bundle of helically formed steel filaments embedded therein. The helically formed steel filament has a filament diameter $\phi$ of 0.23 mm, average diameter D of an outer contour projected to a plane perpendicular to the axial direction of one pitch of 2.07 mm, Dmax/Dmin=1.5, D/$\phi$=9.0 and pitch of 11.7 mm. Twenty-one of these helically formed filaments are assembled together without twisting at random to provide a bundle constituting the reinforcing element. Eight reinforcing elements per 25 mm of the reinforcing layer are used and the center axis of the reinforcing element is included at an angle of 63° with respect to the circumferential direction of the tire. The rubberized ply 15a arranged at the carcass side is inclined toward the left, while the rubberized ply 15b arranged at the belt side is inclined toward the right.

The reinforcing element has a tensile breaking strength of 170 kg/bundle, elongation at tensile breaking strength of 7% and modulus of elasticity of 1,500 kg/mm². Coating rubber covering the reinforcing element has a Shore A hardness of 76°, 300% modulus of elasticity of 200 kg/cm² and elongation at tensile breaking strength of 310%. Each end portion of the reinforcing element 15 is covered on and beneath the coating rubber layers thereof with easily extensible coating rubber over a length of 20 mm. This easily extensible coating rubber has a Shore A hardness of 67°, 300% modulus of elasticity of 134 kg/cm² and elongation at tensile breaking strength of 430%. That is, each end portion of the reinforcing element 15 is covered with two coating rubber layers.

Each of the rubberized plies 15a, 15b of the reinforcing layer 15 is provided at its both sides with coating rubber having a thickness of 1.45 mm and has a final thickness of 3.5 mm. The easily extensible coating rubber covering the above mentioned coating rubber at each end of the rubberized plies 15a, 15b of the reinforcing layer 15 has a thickness of 1.0 mm.

In the present embodiment, there is no risk of the carcass beneath the belt 14 being subjected to the cord wave contrary to the conventional belt composed of steel cords having a small elongation. It is a matter of course that the reinforcing layer 15 disposed on the carcass 11 is not subjected to the cord wave, thereby providing an excellent tire.

Practical road tests have also shown that the tire according to the invention induces no separation failure which has occurred between the carcass and the belt due to the cord wave subjected to the carcass cord.

EXAMPLE 3

Figure 7:
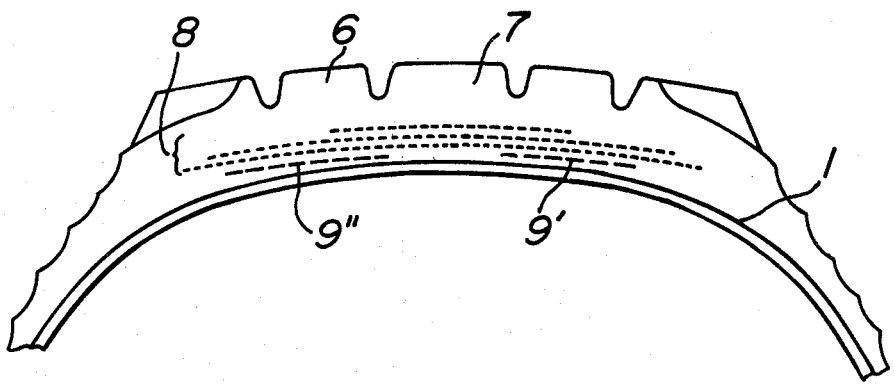

In FIG. 7 is shown a further effective embodiment of the invention. In the present embodiment, the reinforcing layer 9 composed of helically formed filaments is divided into two sections 9', 9". These sections 9', 9" are symmetrically arranged with respect to the tire crown center and a spaced apart 40 mm from each other. Each of these sections 9', 9" has a width of 77.5 mm.

The construction as described above can eliminate the cord wave to be produced on the reinforcing cord layer sections 9', 9". In addition, the reinforcing cord layer sections 9', 9" have a less influence on the ends of the belt. Strain to be produced on the ends of the reinforcing layer per se becomes small, and as a result, it is possible to significantly improve the durability of the belt.

EXAMPLE 4

Figure 8:
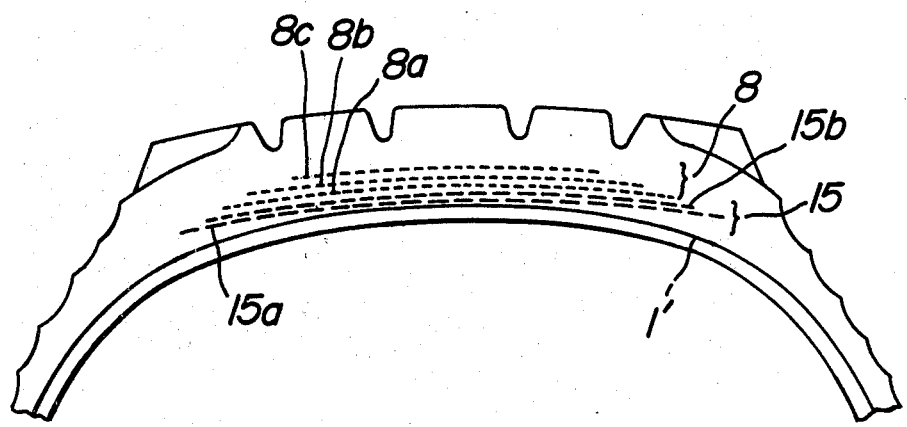

In FIG. 8 is shown a still further modified embodiment of a tire according to the invention comprising a carcass 1' formed of textile cords extending in parallel with the vertical center section through the rotational axis of the tire and a belt 8 formed of steel cords.

A carcass 1' is composed of 3 rubberized plies each formed of nylon cord of 1,890 denier/3 strands. The cord of each of these rubberized plies is inclined at 75° with respect to the circumferential direction of the tire and the cords of adjacent plies are crossed with each other.

The tire has a size of 10.00 R20 16PR. In the present embodiment, on the carcass 1' are superimposed 2 reinforcing layers 15 composed of rubberized cord layers 15a, 15b. The rubberized cord layer 15a arranged at the carcass side is formed of aromatic polyamide cord of 1,500 denier/3 strands having a high modulus of elasticity and inclined toward right at an angle of 60° with respect to the circumferential direction of the tire. This aromatic polyamide cord having a high modulus of elasticity has a tensile breaking strength of 73 kg/cord and elongation at tensile breaking strength of 13%. The rubberized cord layer 15b arranged at the belt side is composed of a reinforcing element formed of a rubberized bundle of helically formed filaments.

The helically formed filament has a filament diameter $\phi$ of 0.25 mm, average diameter D of an outer contour projected on a plane perpendicular to the axial direction of one pitch of the filament of 2.3 mm, Dmax/Dmin=1.5, D/$\phi$=9.2 and pitch of 11 mm. Nine of these filaments are assembled together without twisting at random to provide a bundle for constituting the reinforcing element. The number of the reinforcing elements is 6.5 elements/25 mm. The reinforcing elements are inclined toward the left at an angle of 40° with respect to the circumferential direction of the tire.

The reinforcing element formed of a bundle of helically formed filaments has a tensile breaking strength of 117 kg/bundle and elongation at tensile breaking strength of 7%. The coating rubber covering the reinforcing element has a Shore A hardness of 78°, elongation at tensile breaking strength of 350% and 300% modulus of elasticity of 170 kg/cm$^2$.

In the present embodiment, between the reinforcing layer 15 and a tread is interposed a belt 8 composed of three rubberized cord layers 8a, 8b and 8c arranged in the order as mentioned from the carcass side, respectively. These rubberized cord layers have respective constructions shown in the following Table.

Table

| | Tensile breaking strength | Elongation at tensile breaking strength | Inclined angle |
|---|---|---|---|
| 8a | 188 kg/cord | 3% | 20° toward left |
| 8b | " | " | 20° toward right |
| 8c | " | " | 40° toward left |

Coating rubber covering the belt 8 has a Shore A hardness of 78°, elongation at tensile breaking strength of 350% and 300% modulus of elasticity of 170 kg/cm$^2$.

The above mentioned construction for changing the elongation in a stepwise manner functions to effectively prevent not only the cord wave produced but also tire separation failure.

EXAMPLE 5

Figure 9:
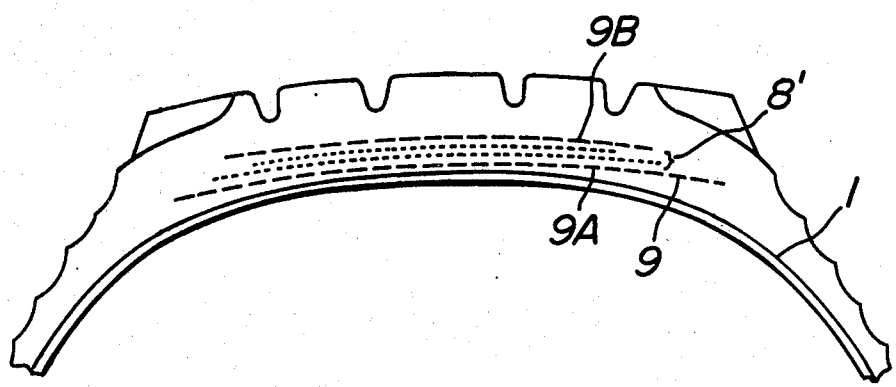

In FIG. 9 is shown another modified embodiment of a tire according to the invention. In the present embodiment, a reinforcing layer 9 is composed of two rubberized cord layers 9A, 9B, each cord being formed of helically formed filaments. These rubberized cord layers 9A, 9B are arranged on and beneath two belts 8'. The rubberized cord layer 9A located at the carcass side has a physical property which is the same as that of the rubberized cord layer of the reinforcing layer 9 described with reference to FIG. 5.

The rubberized cord layer 9B interposed between the belt 8' and a tread is formed of five helically formed filaments each having the following physical property and coated with rubber.

The filament has a diameter $\phi$ of 0.25 mm, average diameter D of an outer contour projected on a plane perpendicular to the axial direction of one pitch of the filament of 0.95 mm, Dmax/Dmin=1.25, D/$\phi$=3.8 and pitch of 10.5 mm. A bundle composed of five helically formed filaments as a whole has a tensile breaking strength of 70 kg/bundle, elongation at tensile breaking strength of 5.5%, modulus of elasticity of 1,800 kg/mm$^2$. The coating rubber bonding these five helically formed filaments has a Shore A hardness of 67°, 300% modulus of elasticity of 134 kg/cm$^2$ and elongation at tensile breaking strength of 430%. The reinforcing element is inclined toward the left at an angle of 18° with respect to the circumferential direction of the tire. Eight reinforcing elements each 25 mm are used.

The belt 8' is composed of two steel cord plies and is the same in construction as the main rubberized cord layers 8A, 8B of the embodiment shown in FIG. 5.

The present embodiment constructed as above described can not only prevent the belt from being waved by the influence of the pattern of tread grooves but also prevent the carcass ply from being waved by the influence of the belt.

The present embodiment constructed as above described can also effectively prevent a cut separation failure and cut burst of the tire which occurs during running on off-road.

What is claimed is:

1. In a pneumatic radial tire comprising a carcass composed of cords arranged substantially parallel with a vertical center section through the rotational axis of the tire and a belt interposed between a tread and said carcass and composed of at least two main cord layers whose cords are formed of an inextensible material such as a steel cord and arranged along different directions crossed at a small angle with respect to the circumferential direction of the tire, the improvement comprising at least one rubberized reinforcing layer interposed between said belt and said carcass and containing reinforcing elements spaced apart from each other and embedded therein, said reinforcing element being formed of at least a helically formed filament, said helically formed filament being formed of material having a tensile breaking strength of at least 140 kg/mm$^2$ and elongation at tensile breaking strength which is at least 1.2 times the smallest elongation at tensile breaking strength of said main cord layers of said belt, and said rubberized reinforcing layer as a whole being extensible and compressible.

2. A pneumatic radial tire as claimed in claim 1, wherein said helically formed filament of said reinforcing element has a filament diameter $\phi$ of 0.1 to 1.0 mm and average diameter D projected on a plane perpendicular to the axial direction of one pitch of the filament and given by $$D = (D_{max} + D_{min})/2$$

of $2\phi$ to $20\phi$.

3. A pneumatic radial tire as claimed in claim 1, wherein said helically formed filament of said reinforcing element is formed of steel wire.

4. A pneumatic radial tire as claimed in claim 1, wherein said main cord layer of said belt contains cords inclined at an angle of at most 30° with respect to the circumferential direction of the tire and said reinforcing element is inclined at an angle of 35° to 90° with respect to the circumferential direction of the tire.

5. A pneumatic radial tire as claimed in claim 1, wherein rubber in which is embedded said reinforcing element has a Shore A hardness of 50° to 85°, 300% modulus of elasticity of 100 to 200 kg/cm$^2$ and tensile breaking strength of 150 to 250 kg/cm$^2$.

* * * * *